US011862451B2

(12) United States Patent
Suzumura et al.

(10) Patent No.: US 11,862,451 B2
(45) Date of Patent: Jan. 2, 2024

(54) ORTHOGONAL ACCELERATION TIME-OF-FLIGHT MASS SPECTROMETER

(71) Applicant: SHIMADZU CORPORATION, Kyoto (JP)

(72) Inventors: Takuya Suzumura, Kyoto (JP); Daisuke Okumura, Kyoto (JP); Tomoya Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 65 days.

(21) Appl. No.: 17/740,991

(22) Filed: May 10, 2022

(65) Prior Publication Data

US 2023/0022148 A1 Jan. 26, 2023

(30) Foreign Application Priority Data

Jul. 21, 2021 (JP) ................................. 2021-121007

(51) Int. Cl.
*H01J 49/40* (2006.01)

(52) U.S. Cl.
CPC .......... *H01J 49/401* (2013.01); *H01J 49/403* (2013.01); *H01J 49/405* (2013.01)

(58) Field of Classification Search
CPC ........ H01J 49/40; H01J 49/401; H01J 49/403; H01J 49/405; H01J 49/406; H01J 49/408
See application file for complete search history.

(56) References Cited

U.S. PATENT DOCUMENTS

2004/0195502 A1* 10/2004 Hashimoto ........... H01J 49/004 250/288
2014/0054456 A1 2/2014 Kinugawa et al.
2014/0224982 A1 8/2014 Furuhashi
2015/0034813 A1* 2/2015 Brown ................ H01J 49/0077 250/281
2017/0278691 A1* 9/2017 Okumura ................ H01J 49/40
2020/0051804 A1* 2/2020 Izumi .................. H01J 49/4265
2021/0125819 A1 4/2021 Kudo et al.
2021/0142999 A1* 5/2021 Kudo .................... H01J 49/068

FOREIGN PATENT DOCUMENTS

JP 2001-229875 A 8/2001
WO 2012/086630 A1 6/2012
WO 2013/051321 A1 4/2013
WO 2016/042632 A1 3/2016
WO 2019/220554 A1 11/2019
WO 2019/229864 A1 12/2019

* cited by examiner

*Primary Examiner* — David E Smith
(74) *Attorney, Agent, or Firm* — Sughrue Mion, PLLC

(57) ABSTRACT

An orthogonal acceleration time-of-flight mass spectrometer (1) includes: an ion ejector (123) which ejects measurement-target ions in a predetermined direction; an orthogonal accelerator (132) which accelerates ions in a direction orthogonal to the direction in which the ions are ejected; a ring electrode (131) located between the ion ejector and the orthogonal accelerator, the ring electrode having an opening for allowing ions to pass through and arranged so that the central axis (C2) of the opening is shifted from the central axis (C1) of the ion ejector in a direction along the axis of the acceleration of the ions by the orthogonal accelerator; a reflectron electrode (134) which creates a repelling electric field for reversing the direction of the ions accelerated by the orthogonal accelerator; and an ion detector (135) which detects ions after the direction of flight of the ions is reversed by the reflectron electrode.

4 Claims, 8 Drawing Sheets

ORTHOGONAL ACCELERATION TIME-OF-FLIGHT MASS SPECTROMETER

TECHNICAL FIELD

The present invention relates to an orthogonal acceleration time-of-flight mass spectrometer.

BACKGROUND ART

In a time-of-flight mass spectrometer (TOF-MS), a cluster of ions derived from a sample component is introduced into a mass separator. An accelerator provided in the mass separator imparts a specific amount of kinetic energy to the cluster of ions to inject the ions into a drift space. Within this space, the ions are made to fly in a path of a predetermined length, and each kind of ion is separately detected. In the accelerator, an ion having a smaller mass-to-charge ratio gains more speed by the acceleration and flies faster within the drift space, so that it will have a shorter time of flight. Accordingly, a mass spectrum can be obtained by preparing a spectrum with the time of flight plotted on the horizontal axis and the intensity of the ion on the vertical axis, and then converting the time of flight into mass-to charge ratio based on previously provided information.

In the time-of-flight mass spectrometer, if the ions injected into the accelerator vary in the initial speed at the point in time where the ions are accelerated, a variation in the time of flight occurs among ions having the same mass-to-charge ratio, which lowers the mass-resolving power. To solve this problem, orthogonal acceleration time-of-flight mass spectrometers have been used (for example, see Patent Literatures 1-5). In an orthogonal acceleration time-of-flight mass spectrometer, a cluster of ions injected into an orthogonal accelerator is accelerated in a direction orthogonal to the incident direction of the ions. This eliminates the influence of the variation in the flight speed in the incident direction and thereby improves the mass-resolving power.

An orthogonal acceleration time-of-flight mass spectrometer includes a pair of plate electrodes (pusher and puller electrodes) arranged so as to face each other, forming an acceleration space in between. A potential gradient directed from the pusher electrode to the puller electrode is created to impart kinetic energy to the ions within the acceleration space. Among the ions within the acceleration space sandwiched between the pusher and puller electrodes, an ion which begins to be accelerated at a closer position to the pusher electrode will receive a greater amount of energy. This difference in the amount of energy imparted to the ions depending on their position within the orthogonal accelerator causes a variation in their time of flight. To cancel this variation, a reflectron has been used. The reflectron is placed at the farthest end of the drift space from the orthogonal accelerator, to create a repelling electric field. In an orthogonal acceleration time-of-flight mass spectrometer including a reflectron, an ion having a larger amount of kinetic energy among the ions having the same mass-to-charge ratio flies deeper into the repelling electric field. This has the effect of cancelling the variation in the time of flight due to the positional spread of the ions in the direction of the acceleration of the ions within the acceleration space. Patent Literature 6 discloses a reflectron configured to create an electric field which can make ions having the same mass-to-charge ratio fly within the drift space with the same period of time, regardless of their amounts of energy, provided that the amounts of energy imparted from the accelerator to the ions are within a previously determined range.

By using the reflectron, the variation in the time of flight due to the positional spread of the ions within the acceleration space can be cancelled. However, this technique cannot cancel a variation in the time of flight due to a difference in the velocity component which each individual ion has in the direction of the orthogonal acceleration. For example, when energy is imparted to an ion flying parallel to the central axis (ion optical axis) in the direction of the injection of the ions into the acceleration space, the ion begins to fly toward the drift space simultaneously with the impartment of the energy. By comparison, when energy is imparted to an ion having a velocity component in an opposite direction to the direction of the orthogonal acceleration (i.e., an ion gradually coming closer to the pusher electrode as it flies), a certain period of time is required for the ion to turn its direction of flight toward the drift space. This period of time is called the "turnaround time". A variation in the time of flight due to this turnaround time cannot be cancelled by the repelling electric field created by the reflectron.

The difference in the velocity component of the ions in the direction of the orthogonal acceleration results from an angular spread of the ion beam exiting, for example, from a collision cell located on the front side the orthogonal accelerator. To solve this problem, a conventional configuration employs an ion guide formed by one or more ring electrodes arranged between the collision cell and the orthogonal accelerator (for example, see Patent Literatures 2-4). In Patent Literatures 2-4, the collision cell, ion guide and orthogonal accelerator are arranged so that their respective central axes (ion optical axes) are aligned with each other. A portion of the gradually spreading ion beam travelling toward the orthogonal accelerator after exiting from the collision cell is extracted by the ion guide within a predetermined area around the ion optical axis. After the angular spread of the ion beam is thus reduced, the ions are introduced into the orthogonal accelerator.

CITATION LIST

Patent Literature

Patent Literature 1: JP 2001-229875 A
Patent Literature 2: WO 2016/042632 A
Patent Literature 3: WO 2019/220554 A
Patent Literature 4: WO 2019/229864 A
Patent Literature 5: WO 2013/051321 A
Patent Literature 6: WO 2012/086630 A

SUMMARY OF INVENTION

Technical Problem

Orthogonal acceleration time-of-flight mass spectrometers are often used for measurements which require a high level of mass-resolving power. Increasing their mass-resolving power to an even higher level of than the conventionally used device having the previously described configuration has been expected.

A possible measure to achieve an even higher mass-resolving power than can be achieved by the conventional configuration is to shorten the turnaround time. For example, Patent Literature 5 discloses the idea of shortening the turnaround time by creating a steeper potential gradient within the acceleration space. However, when such an electric field is created, the spread of the imparted energy depending on the incident position of each ion becomes greater and may possibly exceed the range of the spread of energy that can be compensated for by the reflectron. Another problem relates to the puller electrode. Normally, the puller electrode is a grid electrode in which a number of holes for allowing ions to pass through are formed in a lattice pattern. Applying a high voltage to a grid electrode produces a lens effect, which causes the direction of flight of the ions to bend after their passage through the holes. This effect may prevent some ions from reaching the detector and lower the signal intensity. It may also cause a temporal aberration in the trajectory of the ions deviated from the central axis and lower the mass-resolving power. Additionally, creating a steep potential gradient requires a high-output power source and increases the production cost.

The problem to be solved by the present invention is to provide an orthogonal acceleration time-of-flight mass spectrometer which allows the mass-resolving power to be improved without sacrificing the signal intensity, mass accuracy and production cost.

Solution to Problem

An orthogonal acceleration time-of-flight mass spectrometer according to the present invention developed for solving the previously described problem includes:

an ion ejector configured to eject measurement-target ions in a predetermined direction;

an orthogonal accelerator configured to accelerate ions in a direction orthogonal to the direction in which the ions are ejected;

a ring electrode located between the ion ejector and the orthogonal accelerator, the ring electrode having an opening for allowing ions to pass through and arranged so that the central axis of the opening is shifted from the central axis of the ion ejector in a direction along the axis of acceleration of the ions by the orthogonal accelerator;

a reflectron electrode configured to create a repelling electric field for reversing the direction of the ions accelerated by the orthogonal accelerator; and an ion detector configured to detect ions after the direction of flight of the ions is reversed by the reflectron electrode.

Advantageous Effects of Invention

In the orthogonal acceleration time-of-flight mass spectrometer according to the present invention, measurement-target ions are ejected from the ion ejector in a predetermined direction. The orthogonal accelerator imparts kinetic energy to the ions in a direction orthogonal to the aforementioned direction. The ions are thereby made to fly in a reciprocal path within a drift space, to be ultimately detected by the ion detector. In the present invention, a portion of the gradually spreading ion beam traveling from the ion ejector is extracted by the ring electrode whose central axis is located at a position shifted from the central axis of the ion ejector, i.e., the central axis of the ion beam. As compared to the configuration in which the ion beam is extracted from an area around the central axis of the ion beam, the present configuration can reduce the angular spread of the ion beam entering the orthogonal accelerator. This shortens the turn-around time and improves the mass-resolving power, without sacrificing the signal intensity and mass accuracy. There is no need to use a high-output power source, and no increase in the production cost is incurred.

DESCRIPTION OF EMBODIMENTS

Figure 1:
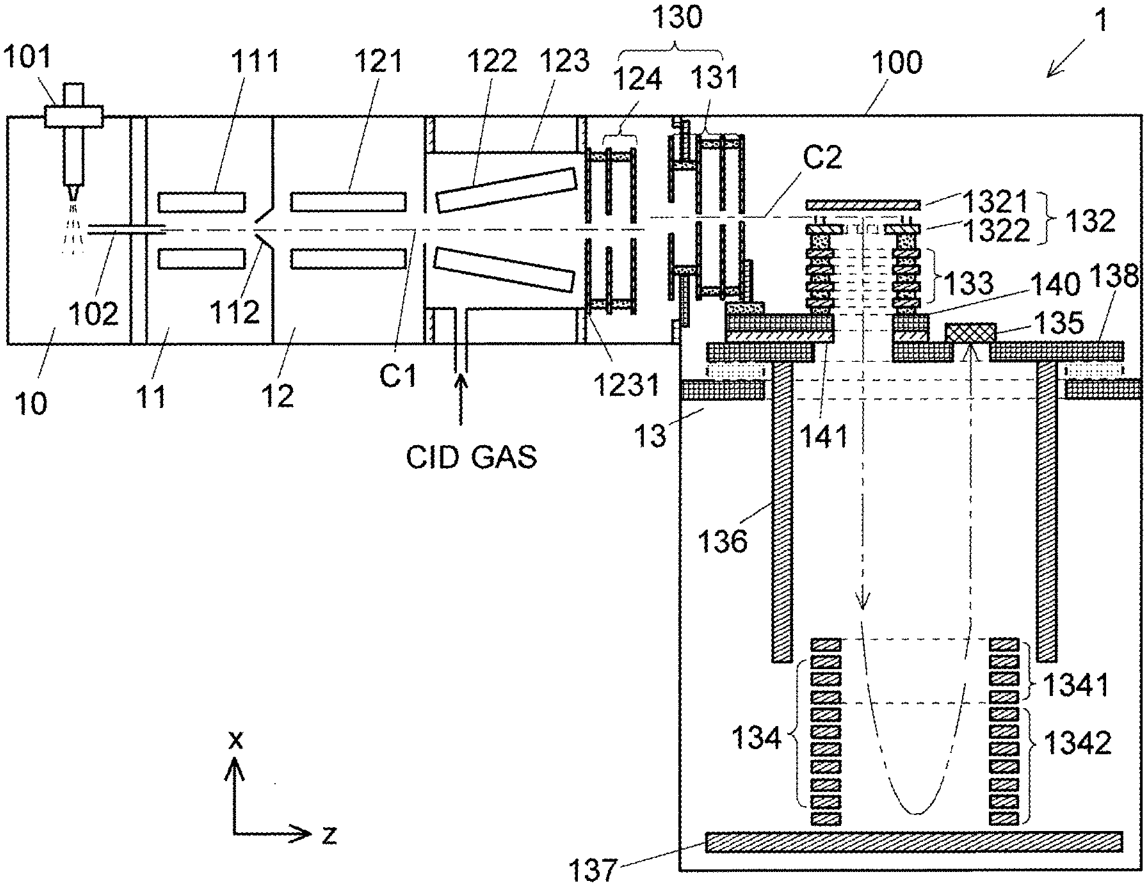
FIG. 1 is an overall configuration diagram of one embodiment of the orthogonal acceleration time-of-flight mass spectrometer according to the present invention.

One embodiment of the orthogonal acceleration time-of-flight mass spectrometer according to the present invention is hereinafter described with reference to the drawings. In the following descriptions, the orthogonal acceleration time-of-flight mass spectrometer according to the present embodiment may be simply called the "mass spectrometer". It should be noted that the components in the drawings are schematically depicted, with their respective shapes and scales appropriately altered from their actual shapes and scales so that the features of the present embodiment can be easily understood.

FIG. 1 shows a schematic configuration of the mass spectrometer 1 according to the present embodiment. The mass spectrometer 1 includes an ionization unit having an ionization chamber 10 formed inside, and a vacuum chamber 100 combined with the ionization unit. The vacuum chamber 100 includes a first intermediate vacuum chamber 11, second intermediate vacuum chamber 12 and analysis chamber 13. The ionization chamber 10 is at substantially atmospheric pressure, while the first intermediate vacuum chamber 11, second intermediate vacuum chamber 12 and analysis chamber 13 have the configuration of a differential pumping system in which their degrees of vacuum are gradually increased in the mentioned order.

The ionization chamber 10 is equipped with an electrospray ionization (ESI) source 101 which ionizes a liquid sample by spraying the liquid sample in the form of droplets while imparting electric charges to those droplets. Although the ion source in the present embodiment is an ESI source, a different type of ion source can also be used. An ion source configured to ionize a gas sample or solid sample may also be used. The ions generated within the ionization chamber 10 are introduced into the first intermediate vacuum chamber 11 through a capillary 102 provided in the partition member between the ionization chamber 10 and the first intermediate vacuum chamber 11. The capillary 102 is heated by a heat source (not shown).

The ions generated within the ionization chamber 10 are drawn into the first intermediate vacuum chamber 11 by a flow of gas which is formed due to the pressure difference between the ionization chamber 10 (which is at substantially atmospheric pressure) and the first intermediate vacuum chamber 11. The solvent in the droplets which still remains in the flow of gas is removed while the gas is passing through the heated capillary 102. The first intermediate vacuum chamber 11 contains a multipole ion guide 111. The ion beam is converged into the vicinity of the ion optical axis C1 by this multipole ion guide 111. The ion beam converged within the first intermediate vacuum chamber 11 enters the second intermediate vacuum chamber 12 through the hole formed at the apex of a skimmer cone 112 provided in the partition member between the first and second intermediate vacuum chambers 11 and 12.

The second intermediate vacuum chamber 12 contains a quadrupole mass filter 121 which separates ions according to their mass-to-charge ratios, a collision cell 123 containing a multipole ion guide 122, and a front transfer electrode 124 for transporting ions ejected from the collision cell 123 (this electrode corresponds to the front part of a transfer electrode 130 for transporting ions from the collision cell 123 to the orthogonal accelerator 132). The members located on the front side of the front transfer electrode 123 (on the side where the ESI source 101 is present) are positioned so that their respective central axes coincide with the ion optical axis C1.

The inner space of the collision cell 123 is continuously or intermittently supplied with a collision-induced dissociation (CID) gas, such as argon or nitrogen. The multipole ion guide 122 in the collision cell 123 includes a plurality of rod electrodes arranged so that the space surrounded by these electrodes gradually widens toward the exit end of the collision cell 123. According to this configuration, a potential gradient for transporting ions toward the exit of the collision cell 123 can be created by simply applying a radio-frequency voltage to each rod electrode. At the exit of the collision cell 123, a ring-shaped exit electrode 1231 having an opening 1232 (see FIGS. 4 and 5) for ejecting ions generated in the collision cell 123 is located.

Figure 2:
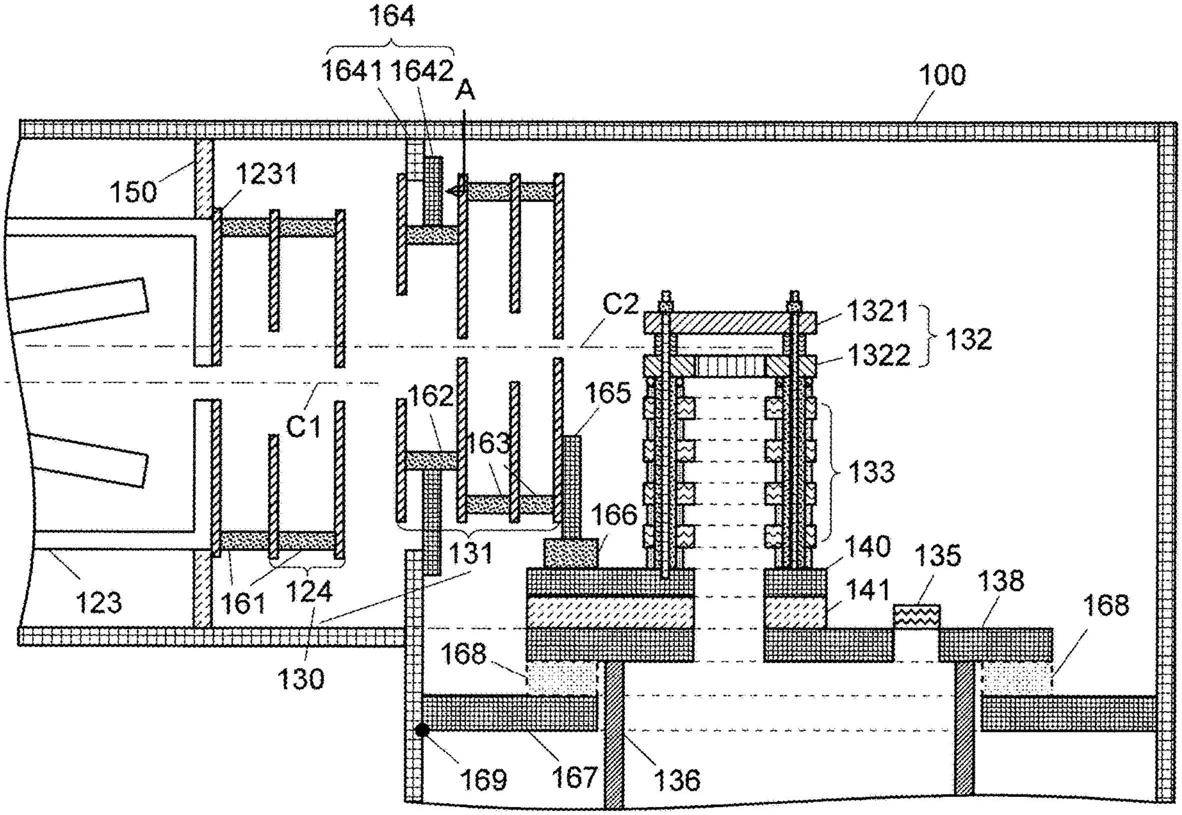
FIG. 2 is a partially enlarged view of the orthogonal acceleration time-of-flight mass spectrometer according to the present embodiment.

A partition wall 164 is provided between the second intermediate vacuum chamber 12 and the analysis chamber 13 (see FIG. 2). The partition wall 164 consists of an extended part 1641 protruding from the inner wall surface of the vacuum chamber 100 and a partition member 1642 fixed to the extended part 1641 with screws (not shown) on the side facing the analysis chamber 13. The vacuum chamber 100 and the extended part 1641 in the present embodiment are prepared as separate members. Alternatively, the extended part 1641 may be integrated with the vacuum chamber 100.

Figure 3:
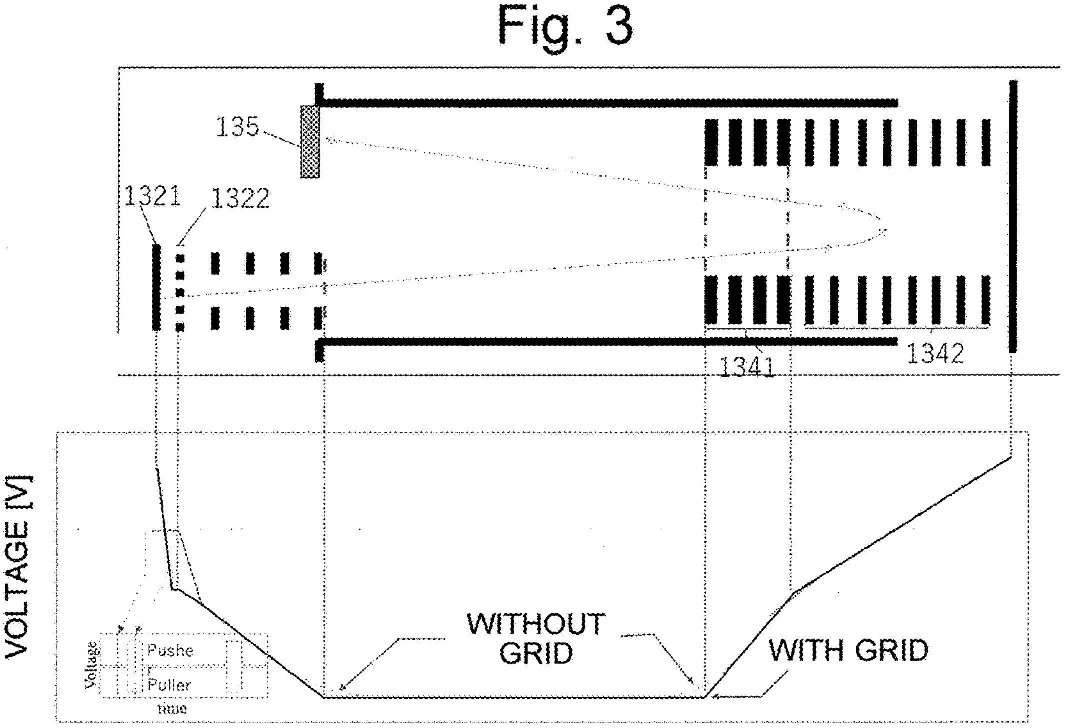
FIG. 3 is a diagram illustrating a potential formed within a flight space in the present embodiment.

The analysis chamber 13 contains: a rear transfer electrode 131 for transporting ions coming from the second intermediate vacuum chamber 12 to the orthogonal accelerator 132 (this electrode corresponds the rear part of the transfer electrode 130 for transporting ions from the collision cell 123 to the orthogonal accelerator 132); an orthogonal accelerator 132 including a pusher electrode 1321 and an puller electrode 1322 facing each other across an ion optical axis C2 (orthogonal acceleration region); a second accelerator 133 for accelerating ions directed from the orthogonal accelerator 132 toward the flight space; a reflectron 134 for forming a path for repelling ions within the flight space; an ion detector 135; and a flight tube 136 and a back plate 137 located on the periphery of the flight space. The reflectron 134, flight tube 136 and back plate 137 collectively define the flight space for the ions. The reflectron 134 consists of a front reflectron 1341 and a rear reflectron 1342. A grid is formed in each of the entrance and exit electrodes of the front reflectron 1341. Thus, as shown in FIG. 3, a field-free flight space is formed within the flight space between the reflectron 134 and the orthogonal accelerator 132, while a rising potential gradient is formed within the space surrounded by the front reflectron 1341, as well as another rising potential gradient formed within the space surrounded by the rear reflectron 1342.

The multipole ion guide 111 in the first intermediate vacuum chamber 11, as well as the quadrupole mass filter 121 and the collision cell 123 in the second intermediate vacuum chamber 12 are each fixed to and positioned on the wall surface of the vacuum chamber 100. The front transfer electrode 124 in the second intermediate vacuum chamber 12 is fixed to and positioned on the collision cell 123.

The mass spectrometer 1 according to the present embodiment is characterized in that the components which define the ion optical axes C1 and C2 are arranged so that the ion optical axis C2, which is the central axis of the rear transfer electrode 131 and the orthogonal accelerator 132, is shifted from the ion optical axis C1 in the direction opposite to the direction in which ions are accelerated by the orthogonal accelerator 132.

Figure 4:
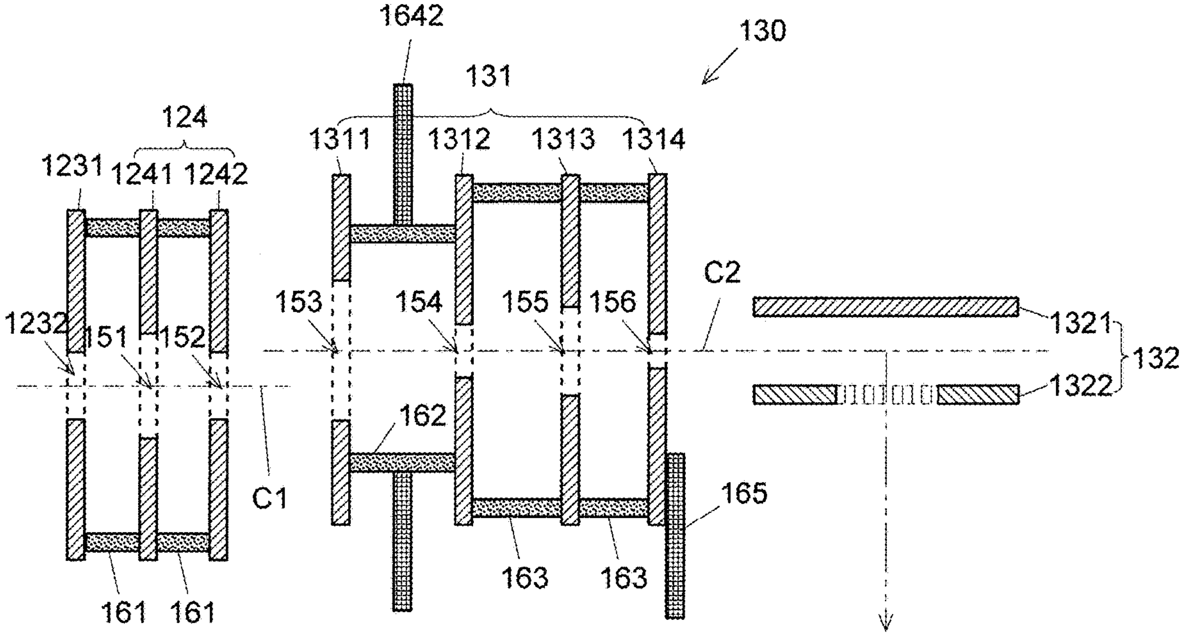
FIG. 4 is a diagram illustrating ion optical axes in the present embodiment.

FIG. 2 is an enlarged view showing the transfer electrode 130, orthogonal accelerator 132 and the surrounding area. FIG. 4 is a diagram showing the positional relationship of the ion optical axes C1 and C2. The transfer electrode 130 includes the front transfer electrode 124 in the second intermediate vacuum chamber 12 and the rear transfer electrode 131 extending from inside the second intermediate vacuum chamber 12 into the analysis chamber 13 through the partition wall 1642.

Figure 5:
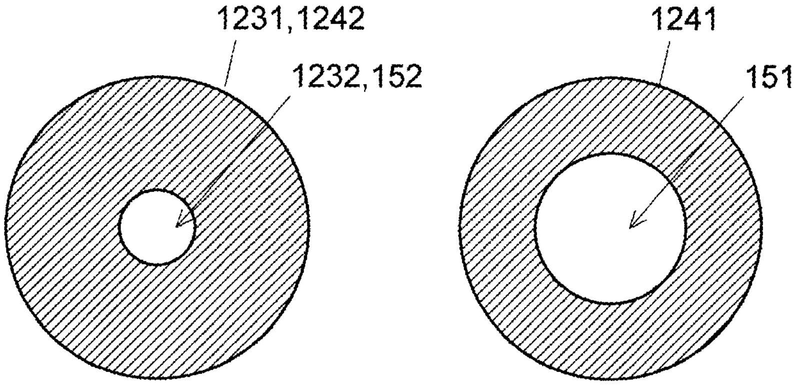
FIG. 5 is a diagram illustrating the shape of a front transfer electrode in the present embodiment.

As shown in FIG. 4, the front transfer electrode 124 consists of two ring electrodes 1241 and 1242. These two ring electrodes 1241 and 1242 are fixed to each other via an insulation member 161. The frontmost ring electrode 1241 in the front transfer electrode 124 is fixed to the exit electrode 1231 of the collision cell 123 via an insulation member 161, whereby the front transfer electrode 124 is positioned. The collision cell 123 is fixed to the vacuum chamber 100 via a fixing member 150. The ring electrodes 1241 and 1242 have central openings 151 and 152 for allowing ions to pass through, respectively. As shown in FIG. 5, the opening 151 of the ring electrode 1241 has a larger diameter than the opening 1232 of the exit electrode 1231 of the collision cell 123 as well as the opening 152 of the ring electrode 1242. The collision cell 123 and the ring electrodes 1241 and 1242 are arranged so that the central axis of the opening 1232 of the exit electrode 1231 of the collision cell 123 is aligned with the central axis of the openings 151 and 152 of the ring electrodes 1241 and 1242 (ion optical axis C1).

Figure 6:
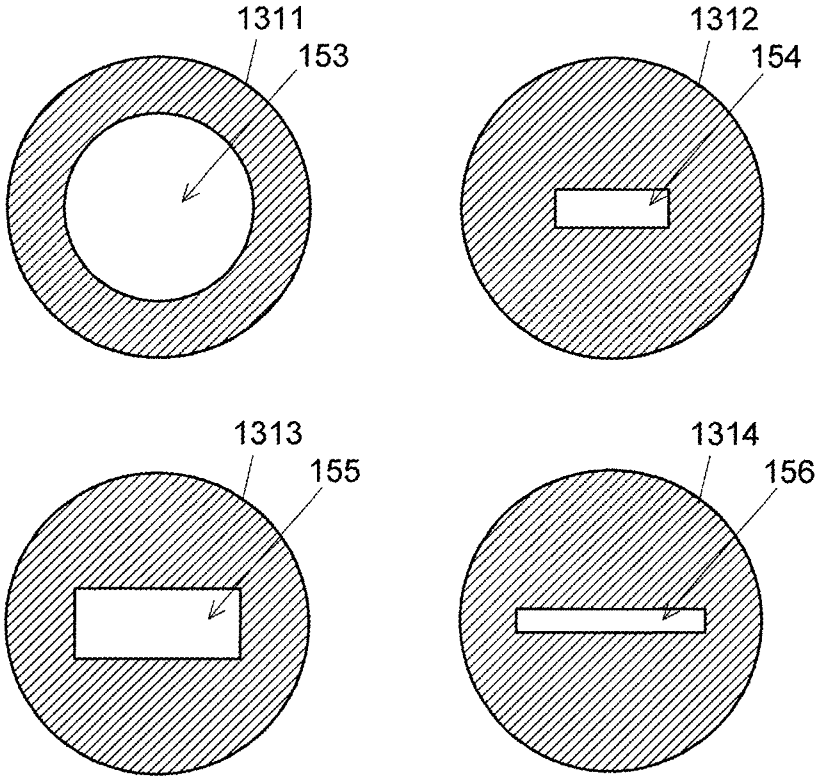
FIG. 6 is a diagram illustrating the shape of a rear transfer electrode in the present embodiment.

As shown in FIG. 6, the rear transfer electrode 131 consists of four ring electrodes 1311, 1312, 1313 and 1314. These four ring electrodes 1311, 1312, 1313 and 1314 are also fixed to each other via insulation members 162 and 163. The frontmost ring electrode 1311 (on the side of the ionization chamber 10) is located within the second intermediate vacuum chamber 12, while the other three ring electrodes 1312, 1313 and 1314 are located within the analysis chamber 13. The insulation member 162 connecting the two ring electrodes 1311 and 1312 on the front side has an outer shape corresponding to the opening formed in the partition member 1642 separating the second intermediate vacuum chamber 12 and the analysis chamber 13. The insulation member 162 is fitted in this opening. The insulation member 162 thus held is slidable along the ion optical axis C2. The outer shape of the insulation member 162 in the present embodiment has a circular in outer shape.

The ring electrode 1311 in the second intermediate vacuum chamber 12 has a circular opening 153 having a larger diameter than the opening 152 of the ring electrode 1242. The ring electrodes 1312, 1313 and 1314 in the analysis chamber 13 have rectangular openings 154, 155 and 156, respectively, which correspond to the opening formed in the ion-entrance surface of the orthogonal accelerator 132 located after these electrodes.

At a predetermined position 169 on the side wall of the vacuum chamber 100 within the analysis chamber 13, a plate-shaped base member 167 having a rectangular opening at its center is fixed. In the present embodiment, the vacuum chamber 100 and the base member 167 are prepared as separate parts. Alternatively, the base member 167 may be integrated with the vacuum chamber 100. A base plate 138 made of an electrically conductive material and having two ion-passing openings is fixed to the upper surface of the base member 167 via an insulation member 168. Located on the upper surface of the base plate 138 is a plate-shaped spacer member 141 made of an electrically conductive material and having an ion-passing opening, on which a rectangular positioning plate 140 made of an electrically conductive material and having an ion-passing opening is fixed. The rearmost ring electrodes 1314 in the rear transfer electrode 131 is fixed to this positioning plate 140 via a conducting member 165 and an insulation member 166.

Also fixed to the positioning plate 140 is an ion acceleration unit, which includes the orthogonal accelerator 132 formed by the pusher and puller electrodes 1321 and 1322, as well as the second accelerator 133. Additionally, the ion detector 135 is fixed to the base plate 138.

The ion acceleration unit includes, on the positioning plate 140, the second accelerator 133 formed by alternately stacking insulation members and acceleration electrodes, on which the puller electrode 1322 is placed via an insulation member and an elastic member, on which the pusher electrode 1321 is further placed via an insulation member. The puller electrode 1322 is a grid-shaped electrode. The acceleration electrodes are ring-shaped electrodes each of which has a central opening for allowing ions to pass through.

The configuration according to the present embodiment in which the spacer member 141 is used to make the level of the ion optical axis C2 higher than that of the ion optical axis C1 is nothing more than a specific example. The ion optical axis C2 may be shifted from the ion optical axis C1 without using the spacer member 141, for example, by appropriately adjusting the thickness of one or more members among the base member 167, insulation member 168, base plate 138 and positioning plate 140.

In a conventional orthogonal acceleration time-of-flight mass spectrometer, the components from the capillary 102 to the orthogonal accelerator 132 are arranged so that their respective central axes (ion optical axis C) are aligned with each other. A portion of the gradually spreading ion beam travelling forward after exiting from the exit electrode of the collision cell is extracted from an area around the ion optical axis C by the front and rear transfer electrodes and introduced into the orthogonal accelerator.

By comparison, in the orthogonal acceleration time-of-flight mass spectrometer 1 according to the present embodiment, the central axes of the components from the capillary 102 to the front transfer electrode 124 are aligned to form one ion optical axis, C1, while those of the rear transfer electrode 131 and the orthogonal accelerator 132 are aligned to form another ion optical axis, C2. The spacer member 141 is provided to shift the ion optical axis C2 from the ion optical axis C1 in the direction opposite to the direction in which ions are accelerated by the orthogonal accelerator 132.

The effect obtained by shifting the ion optical axis C2 from the ion optical axis C1 in this manner has been confirmed by a simulation. The simulation result is hereinafter described.

Figure 7:
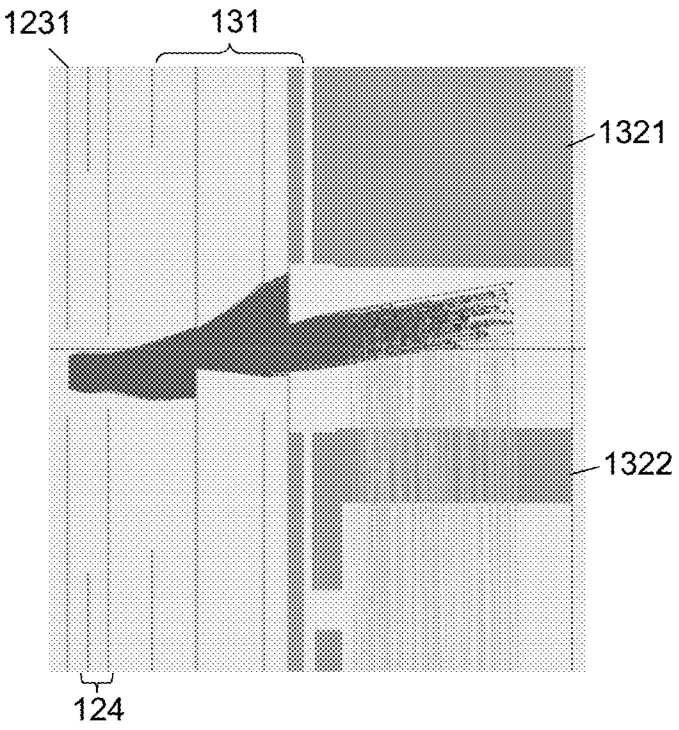
FIG. 7 is the result of a simulation of the shape of the ion beam entering the orthogonal accelerator in the orthogonal acceleration time-of-flight mass spectrometer according to the present embodiment.
Figure 8:
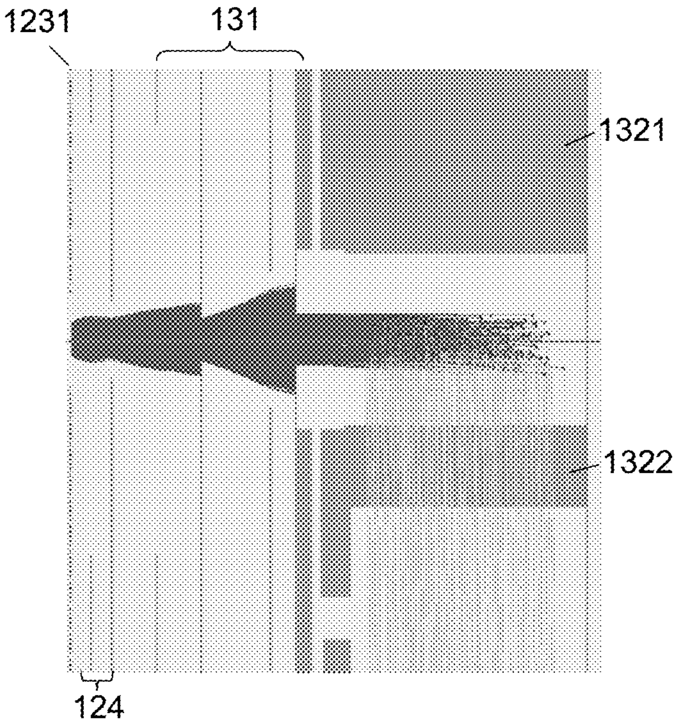
FIG. 8 is the result of a simulation of the shape of the ion beam entering an orthogonal accelerator in a conventional orthogonal acceleration time-of-flight mass spectrometer.

FIGS. 7 and 8 show the result of the simulation of the sectional shape of an ion beam entering the orthogonal accelerator 132 in the orthogonal acceleration time-of-flight mass spectrometer 1 according to the present embodiment (present example), and that of an ion beam entering the orthogonal accelerator in a conventional orthogonal acceleration time-of-flight mass spectrometer (conventional example). In the conventional example, the ion beam is almost equally spread toward both the pusher and puller electrodes with respect to the ion optical axis C when entering the orthogonal accelerator. By comparison, in the present example, the ion beam is biased toward the pusher electrode 1321 when entering the orthogonal accelerator 132.

Figure 9:
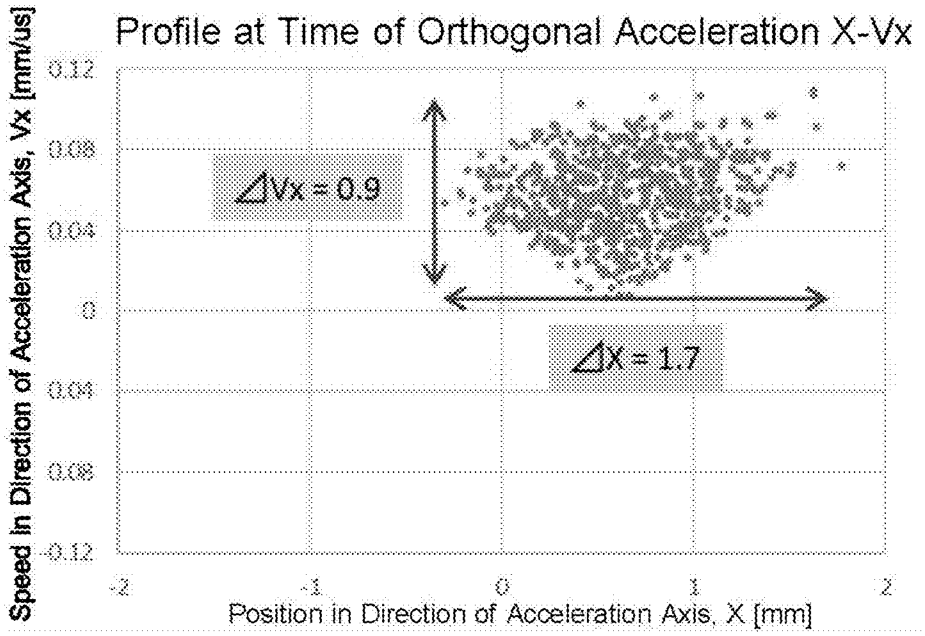
FIG. 9 is the result of a simulation of the positional spread of the ion beam entering the orthogonal accelerator and the distribution of the velocity component in the direction of the orthogonal acceleration in the orthogonal acceleration time-of-flight mass spectrometer according to the present embodiment.
Figure 10:
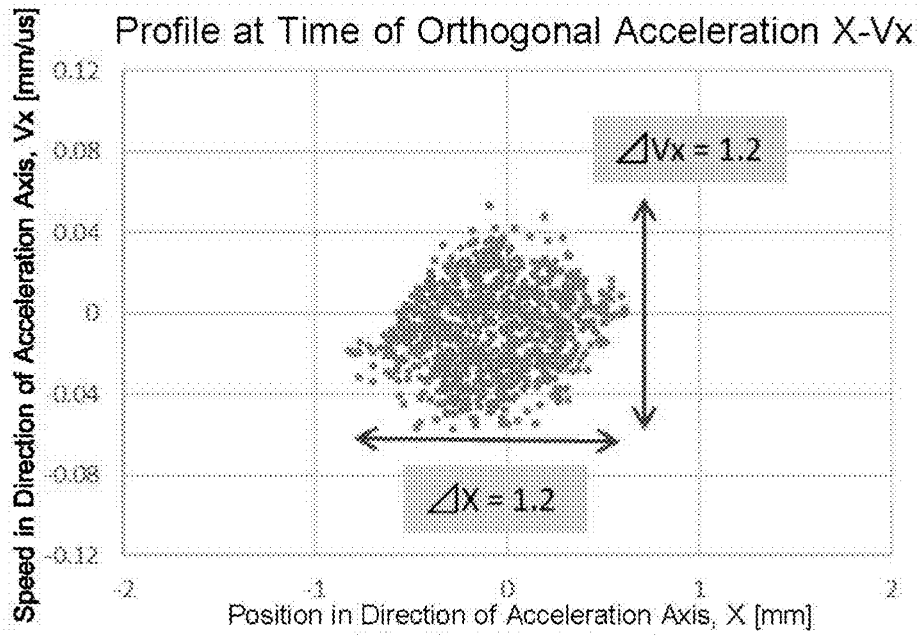
FIG. 10 is the result of a simulation of the positional spread of the ion beam entering the orthogonal accelerator and the distribution of the velocity component in the direction of the orthogonal acceleration in a conventional orthogonal acceleration time-of-flight mass spectrometer.

FIGS. 9 and 10 show the spread ΔX of the position X of the ions at the point in time of the acceleration of the ions within the orthogonal accelerator and the distribution ΔVx of the velocity component Vx in the direction of the orthogonal acceleration in the previously described embodiment and the conventional example, respectively. The spread ΔX of the position X of the ions in the conventional example (FIG. 10; 1.2 mm) is smaller than in the present embodiment (FIG. 9; 1.7 mm). The kinetic energy imparted to each ion within the orthogonal accelerator changes depending on the position of the ion within the orthogonal accelerator. However, the variation in the time of flight due to this difference in kinetic energy will be compensated for while the ions fly in the electric field created by the reflectron. Specifically, among the ions having the same mass-to-charge ratio, an ion having a larger amount of kinetic energy will fly deeper into the repelling electric field. This has the effect of cancelling the variation in the time of flight due to the positional spread of the ions in the direction of the acceleration within the acceleration space. In particular, when the reflectron described in Patent Literature 6 is used, the variation in the time of flight can be compensated for over an even wider range of energy. Accordingly, the positional variation of the ions within the orthogonal accelerator poses no serious problem in improving the mass-resolving power, provided that the ions are within a range of energy that can be compensated for by the reflectron.

On the other hand, the difference ΔVx in the velocity component Vx of the ions in the direction of the orthogonal acceleration within the orthogonal accelerator gives rise to a turnaround time at the beginning of the orthogonal acceleration of each ion. The variation in the time of flight due to this turnaround time cannot be cancelled by the reflectron. As shown in FIG. 9, by adopting the configuration according to the present embodiment, the difference ΔVx in the velocity component of the ions in the direction of the orthogonal acceleration is decreased as compared to the conventional example (from 1.2 mm/μs to 0.9 mm/μs). This reduces the decrease in the mass-resolving power due to the variation in the time of flight originating from the turnaround time.

Figure 11:
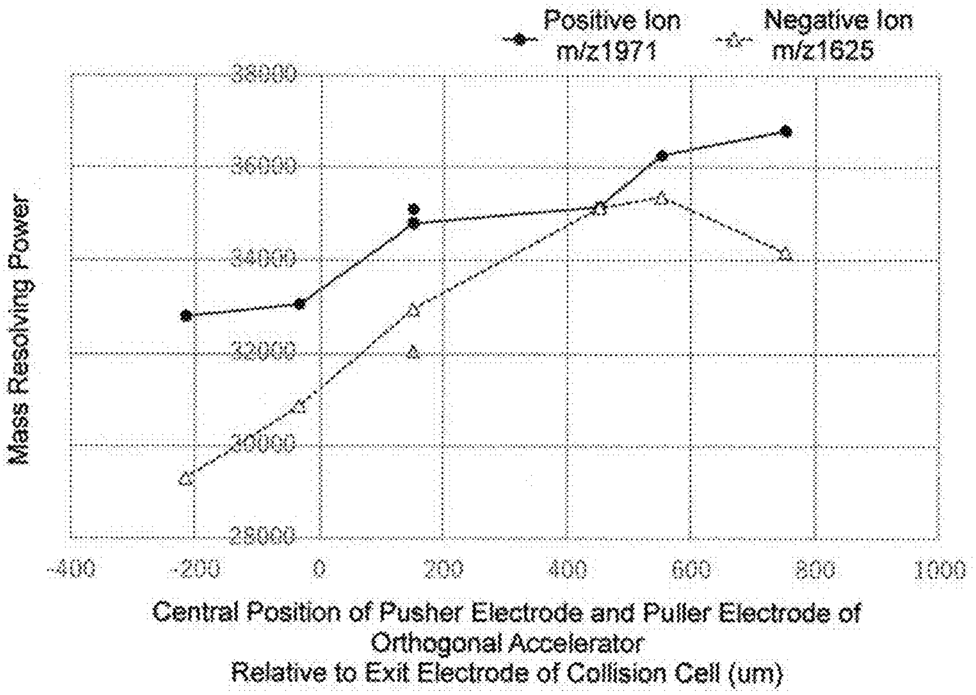
FIG. 11 is a graph illustrating the relationship between the position of the ion optical axis and the mass-resolving power based on a measurement result obtained with a real apparatus.
Figure 12:
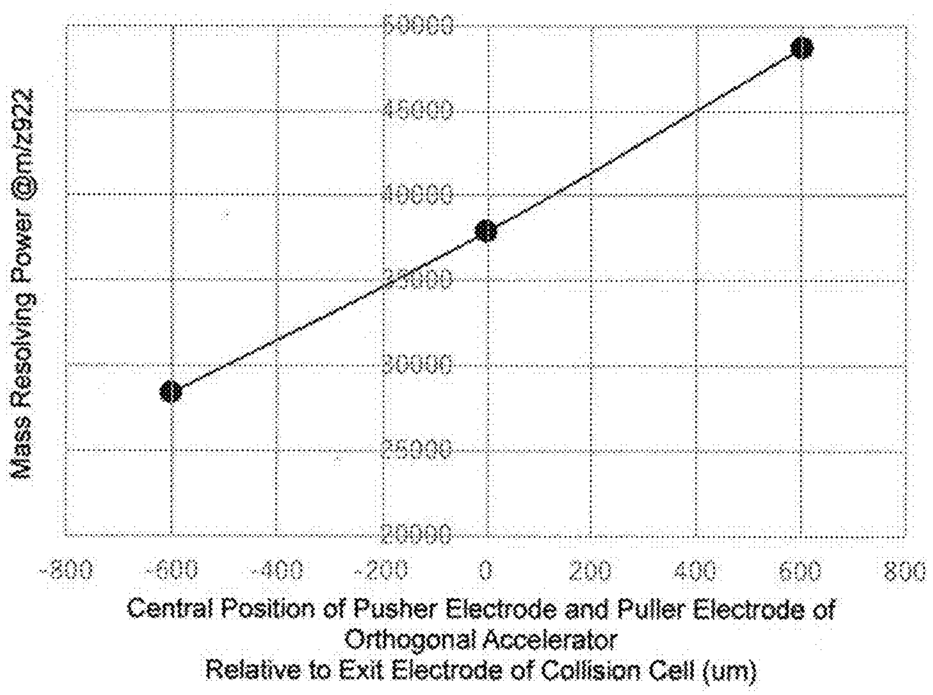
FIG. 12 is a graph illustrating the relationship between the position of the ion optical axis and the mass-resolving power based on a simulation result.

FIG. 11 shows the result of a measurement in which the mass-resolving power for a positive ion (m/z=1971) and a negative ion (m/z=1625) was measured by a real orthogonal acceleration time-of-flight mass spectrometer, with the position of the ion optical axis C2 relative to the ion optical axis C1 varied. FIG. 12 shows the results of a simulation in which the mass-resolving power for a positive ion (m/z=922) was calculated for different positions of the ion optical axis C2 relative to the ion optical axis C1. In FIGS. 11 and 12, the horizontal axis represents the position of the central axis of the pusher and puller electrodes 1321 and 1322 of the orthogonal accelerator 132 (ion optical axis C2) relative to the central axis of the exit electrode 1231 of the collision cell 123 (ion optical axis C1), while the vertical axis represents the mass-resolving power. In both FIGS. 11 and 12, it can be seen that the mass-resolving power becomes higher as the ion optical axis C2 is gradually shifted from the ion optical axis C1 in the positive direction (i.e., in the direction opposite to the direction of the orthogonal acceleration of the ions).

The distribution of the ions around the ion optical axis C1 is such that the number of ions becomes larger as the position to the optical axis C1 is closer, and vice versa. Accordingly, while the mass-resolving power becomes higher as the ion optical axis C2 is shifted farther from the ion optical axis C1, an excessive shift will cause a considerable decrease in the amount of the ions passing through the openings 153-156 of the rear transfer electrode 131, lowering the measurement sensitivity of the ions. Accordingly, the relationship between the mass-to-charge ratio and the sensitivity should be considered in determining the magnitude by which the ion optical axis C2 is shifted from the ion optical axis C1. In order to improve the mass-resolving power without significantly sacrificing the measurement sensitivity, it is appropriate to shift the axis by roughly one half (e.g., within a range from 25% to 75%) of the width, in the acceleration direction, of the opening of the ring electrode which blocks the ions (in the present embodiment, the length of the shorter side of the opening 154). In the present embodiment, the shift of the ion optical axis C2 from the ion optical axis C1 is approximately 0.3 mm. In many cases, shifting the axis by an amount corresponding to 25% of the width, in the acceleration direction, of the opening of the ion-blocking ring electrode will significantly improve the mass-resolving power. On the other hand, shifting the axis by an amount greater than 75% of that width will cause a considerable decrease in the amount of the ions passing through the opening and lowers the measurement sensitivity of the ions.

The results in the examples of FIGS. 11 and 12 demonstrate that shifting the ion optical axis C2 from the ion optical axis C1 in the negative direction lowers the mass-resolving power. This is due to the fact that shifting the ion optical axis C2 in the negative direction brings the incident position of the ions closer to the puller electrode 1322, which causes the amount of kinetic energy imparted within the orthogonal accelerator 132 to be decreased and consequently go out of the range of the kinetic energy which can be compensated for by the reflectron. When a reflectron having a wider range for compensating for the variation in the kinetic energy imparted in the orthogonal accelerator is used, the mass-resolving power can also be improved even with a configuration in which the ion optical axis C2 is shifted in the negative direction.

Patent Literature 5 discloses the idea of creating a steeper potential gradient within the orthogonal accelerator 132 in order to shorten the turnaround time. However, creating a steeper potential gradient within the orthogonal accelerator 132 means that the spread of the energy imparted to the ions depending on the incident position of each ion becomes greater and may possibly exceed the range of the spread of energy that can be compensated for by the reflectron.

The puller electrode is normally a grid electrode in which a number of holes for allowing ions to pass through are formed in a lattice pattern. Applying a high voltage to a grid electrode produces a lens effect, which causes the direction of flight of the ions to bend after their passage through the holes. This effect may prevent some ions from reaching the ion detector 135 and lower the signal intensity. It may also cause a temporal aberration in the trajectory of the ions deviated from the central axis and lower the mass-resolving power. The amount of divergence ΔVy of an ion after its passage through a grid electrode (i.e., the change in the velocity of an ion in the y-axis direction before and after its passage through the grid) is expressed by the following equation:

$$\Delta Vy = qEP/2mVx \quad (1)$$

where q is the number (or amount) of the charge of the ion, E is the electric field created at the grid electrode, P is the grid interval, m is the mass of the ion, and Vx is the velocity of the ion in the x-axis direction.

Figure 13:
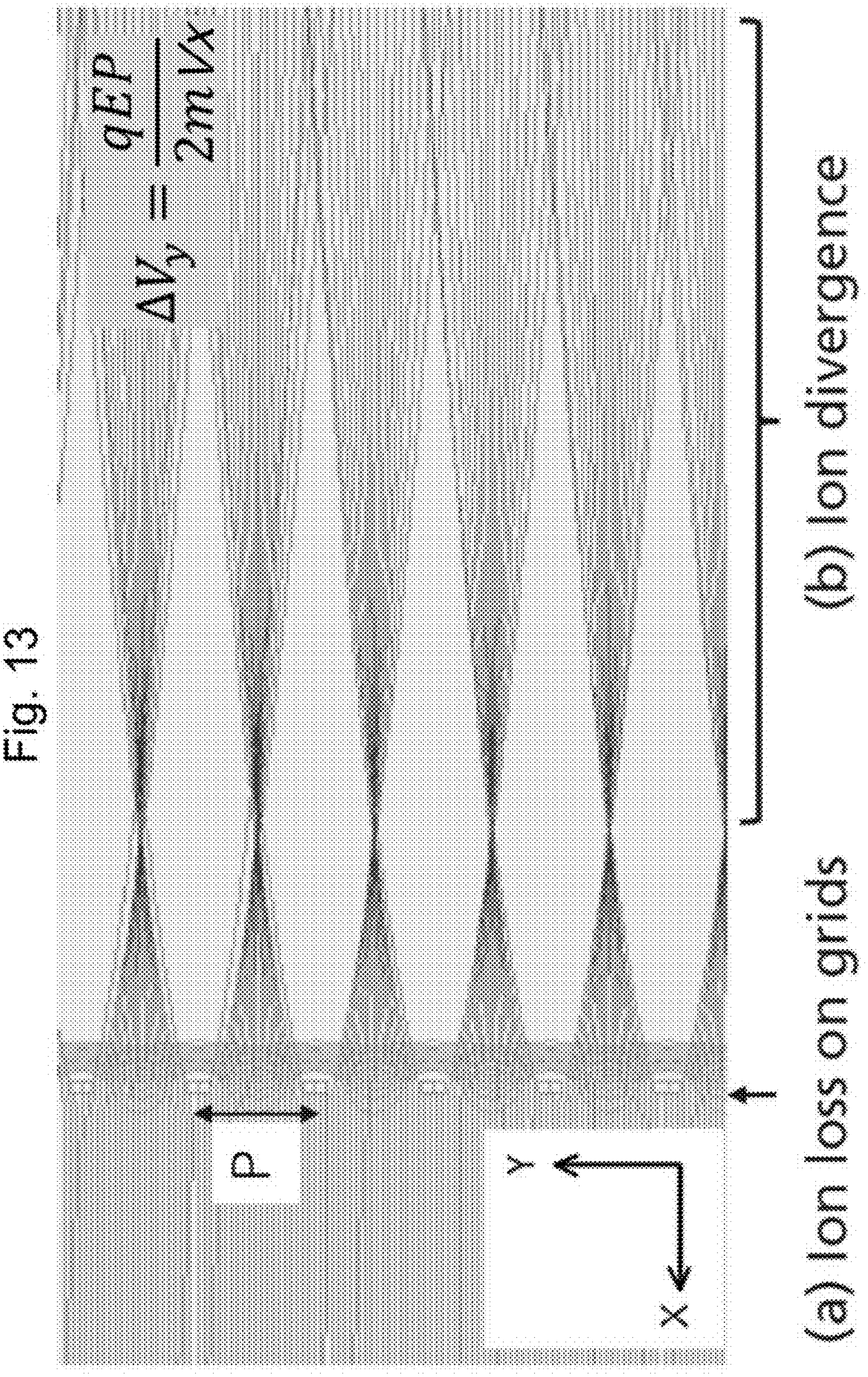
FIG. 13 is a graphic illustrating the divergence of an ion beam passing through a grid electrode.

As can be understood from equation (1), the stronger the electric field created at the grid electrode is, the larger the change in the velocity of the ion in the y-axis direction is. The y-axis is orthogonal to both the direction of the injection of the ions into the orthogonal accelerator 132 (z-axis) and the direction of the acceleration axis (x-axis). As can be seen in FIG. 13 which shows the simulation result based on equation (1), increasing the potential gradient created within the orthogonal accelerator 132 leads to a significant change in the velocity component of the ion in the y-axis direction. Consequently, the signal intensity will be lowered due to some ions failing to reach the ion detector 135. A temporal aberration may also occur in the trajectory of the ions deviated from the central axis and lower the mass-resolving power.

Increasing the magnitude of a pulse voltage applied in the orthogonal accelerator 132 also requires a high-output power source and incurs an increase in cost. Applying a high voltage also increases the possibility of electric discharge, which may possibly lower the mass-resolving power or mass accuracy as well as cause some problem in the power source or other related sections.

The previous embodiment is a specific example and can be appropriately changed or modified along the gist of the present invention.

In the previous embodiment, a portion of the ion beam exiting from the collision cell 123 is extracted by each of the ring electrodes 1312 and 1314 which form the rear transfer electrode 131. It is not always necessary to use two or more ring electrodes for this purpose. It is possible to use a single ring electrode to extract a portion of the ion beam exiting from the collision cell 123. In that case, the single ring electrode should be arranged so that the central axis of the ion-passage opening formed in the electrode is shifted from the central axis of the collision cell 123 in a direction along the axis of acceleration of the ions (and preferably, in the direction opposite to the direction of the acceleration of the ions).

In the previous embodiment, the components which define the ion optical axes C1 and C2 are arranged so that the ion optical axis C1 of the components located on the front side of the front transfer electrode 124 is parallel to the ion optical axis C2 of the rear transfer electrode 131 and the orthogonal accelerator 132. As another possible arrangement, the collision cell 123 (more exactly, the collision cell 123 and the front transfer electrode 124, or the components on the front side of the collision cell 123) may be tilted with respect to the rear transfer electrode 131 and the orthogonal accelerator 132 around the center of the entrance of the collision cell 123 so as to shift (or tilt) the ion optical axis C2 with respect to the central axis C1 of the exit electrode of the collision cell 123.

In the previous embodiment, the rear transfer electrode 131 and the orthogonal accelerator 132 are arranged so that they have a common central axis (ion optical axis C2). It is not always necessary for their respective central axes to coincide with each other. The minimum requirement is that the ion beam which has passed through the rear transfer electrode 131 should enter the orthogonal accelerator 132. However, making their respective central axes coincide with each other is advantageous in that the ion beam which has passed through the rear transfer electrode 131 can be directed at an appropriate position between the pusher and puller electrodes 1321 and 1322 so that the ions are less likely to collide with these electrodes and be lost.

The previous embodiment is concerned with the configuration for the orthogonal acceleration of ions ejected from the collision cell 123. The previously described configuration can be similarly employed for the orthogonal acceleration of ions generated by a different type of component, such as an ion trap. The previously embodiment is configured as a tandem system including the quadrupole mass filter 121 as the front mass separator. The previously described configuration can be similarly employed in a device in which ions generated by the ion source are directly subjected to the orthogonal acceleration for the measurement.

[Modes]

A person skilled in the art can understand that the previously described illustrative embodiments are specific examples of the following modes of the present invention.

(Clause 1)

An orthogonal acceleration time-of-flight mass spectrometer according to one mode of the present invention includes:

an ion ejector configured to eject measurement-target ions in a predetermined direction;

an orthogonal accelerator configured to accelerate ions in a direction orthogonal to the direction in which the ions are ejected;

a ring electrode located between the ion ejector and the orthogonal accelerator, the ring electrode having an opening for allowing ions to pass through and arranged so that the central axis of the opening is shifted from the central axis of the ion ejector in a direction along the axis of acceleration of the ions by the orthogonal accelerator;

a reflectron electrode configured to create a repelling electric field for reversing the direction of the ions accelerated by the orthogonal accelerator; and an ion detector configured to detect ions after the direction of flight of the ions is reversed by the reflectron electrode.

In the orthogonal acceleration time-of-flight mass spectrometer described in Clause 1, measurement-target ions are ejected from the ion ejector in a predetermined direction. The orthogonal accelerator imparts kinetic energy to the ions in a direction orthogonal to the aforementioned direction. The ions are thereby made to fly in a reciprocal path within a drift space, to be ultimately detected by the ion detector. In the orthogonal acceleration time-of-flight mass spectrometer described in Clause 1, a portion of the gradually spreading ion beam traveling from the ion ejector is extracted by the ring electrode whose central axis is located at a position shifted from the central axis of the ion ejector, i.e., the central axis of the ion beam. As compared to the configuration in which the ion beam is extracted from an area around the central axis of the ion beam, the present configuration can reduce the angular spread of the ion beam entering the orthogonal accelerator. This shortens the turn-around time and improves the mass-resolving power, without sacrificing the signal intensity and mass accuracy. Since the potential gradient created within the orthogonal accelerator only needs to be as steep as a conventional gradient, there is no need to use a high-output power source, and no increase in the production cost is incurred.

(Clause 2)

The orthogonal acceleration time-of-flight mass spectrometer described in Clause 1 may be configured as follows:

the orthogonal accelerator is formed by a pusher electrode and a puller electrode which are a pair of plate electrodes; and the ring electrode is arranged so that the central axis of the opening of the ring electrode lies halfway between the pusher electrode and the puller electrode.

In the orthogonal acceleration time-of-flight mass spectrometer described in Clause 2, the central axis of the opening of the ring electrode lies halfway between the pusher electrode and the puller electrode forming the orthogonal accelerator. Therefore, the cluster of ions which have passed through the opening of the ring electrode can enter an area around the center of the orthogonal acceleration space without colliding with the pusher or puller electrode.

(Clause 3)

In the orthogonal acceleration time-of-flight mass spectrometer described in Clause 1 or 2, the ring electrode may be arranged so that the central axis of the opening of the ring electrode is shifted from the central axis of the ion ejector in a direction opposite to the direction in which ions are accelerated by the orthogonal accelerator.

In the orthogonal acceleration time-of-flight mass spectrometer described in Clause 1 or 2, the central axis of the opening of the ring electrode may be shifted from the central axis of the ion ejector either in the direction in which ions are accelerated by the orthogonal accelerator or in the opposite direction. However, it should be noted that the reflectron used in the orthogonal acceleration time-of-flight mass spectrometer has a limited range of kinetic energy within which the reflectron can cancel the spread of the time of flight due to the difference in the kinetic energy imparted to the individual ions caused by the positional spread of the ions within the orthogonal accelerator. When the ring electrode is arranged so that the central axis of the opening of the ring electrode is shifted from the central axis of the ion ejector in the direction of the acceleration of the ions, the cluster of ions will enter an area which is rather close to the puller electrode. In that case, the kinetic energy imparted to the cluster of ions will be low and may possibly fail to fall within the aforementioned range if there is only a narrow range of kinetic energy within which the variation of the kinetic energy can be cancelled by the reflectron. Accordingly, it is preferable to adopt the configuration in which the ring electrode is arranged so that the central axis of the opening of the ring electrode is shifted from the central axis of the ion ejector in the direction opposite to the direction of the acceleration of the ions so as to inject the cluster of ions into an area which is rather close to the pusher electrode, as in the orthogonal acceleration time-of-flight mass spectrometer described in Clause 3.

(Clause 4)

The orthogonal acceleration time-of-flight mass spectrometer described in any of Clauses 1-3 may include an arrangement of a plurality of the ring electrodes.

In the orthogonal acceleration time-of-flight mass spectrometer described in Clause 4, the angular spread of the ion beam entering the orthogonal accelerator can be even more reduced by the openings of the plurality of ring electrodes.

REFERENCE SIGNS LIST

1 . . . Orthogonal Acceleration Time-of-Flight Mass Spectrometer
10 . . . Ionization Chamber
101 . . . ESI (Electrospray Ionization) Source
11 . . . First Intermediate Vacuum Chamber
111 . . . Multipole Ion Guide
12 . . . Second Intermediate Vacuum Chamber
121 . . . Quadrupole Mass Filter
122 . . . Multipole Ion Guide
123 . . . Collision Cell
1231 . . . Exit Electrode
124 . . . Front Transfer Electrode
1241, 1242 . . . Ring Electrode
13 . . . Analysis Chamber
130 . . . Transfer Electrode
131 . . . Rear Transfer Electrode
1311, 1312, 1313, 1314 . . . Ring Electrode
132 . . . Orthogonal Accelerator
1321 . . . Pusher Electrode
1322 . . . Puller Electrode
133 . . . Second Accelerator
134 . . . Reflectron
1341 . . . Front Reflectron
1342 . . . Rear Reflectron
135 . . . Ion Detector
136 . . . Flight Tube
137 . . . Back Plate
138 . . . Base Plate
140 . . . Positioning Plate
141 . . . Spacer Member
150 . . . Fixing Member

The invention claimed is:

1. An orthogonal acceleration time-of-flight mass spectrometer, comprising:
- an ion ejector configured to eject measurement-target ions in a predetermined direction;
- an orthogonal accelerator configured to accelerate ions in a direction orthogonal to the direction in which the ions are ejected;
- a ring electrode located between the ion ejector and the orthogonal accelerator, the ring electrode having an opening for allowing ions to pass through and arranged so that a central axis of the opening is shifted from a central axis of the ion ejector in a direction along an axis of acceleration of the ions by the orthogonal accelerator;
- a reflectron electrode configured to create a repelling electric field for reversing a direction of the ions accelerated by the orthogonal accelerator; and
- an ion detector configured to detect ions after the direction of flight of the ions is reversed by the reflectron electrode.

2. The orthogonal acceleration time-of-flight mass spectrometer according to claim 1, wherein:
- the orthogonal accelerator is formed by a pusher electrode and a puller electrode which are a pair of plate electrodes; and
- the ring electrode is arranged so that the central axis of the opening of the ring electrode lies halfway between the pusher electrode and the puller electrode.

3. The orthogonal acceleration time-of-flight mass spectrometer according to claim 1, wherein the ring electrode is arranged so that the central axis of the opening of the ring electrode is shifted from the central axis of the ion ejector in a direction opposite to the direction in which ions are accelerated by the orthogonal accelerator.

4. The orthogonal acceleration time-of-flight mass spectrometer according to claim 1, comprising an arrangement of a plurality of the ring electrodes.

* * * * *